May 14, 1957 H. E. SCHRADER 2,791,857
FISHING EQUIPMENT
Filed Sept. 14, 1955

United States Patent Office 2,791,857
Patented May 14, 1957

2,791,857

FISHING EQUIPMENT

Henry E. Schrader, Crivitz, Wis.

Application September 14, 1955, Serial No. 534,189

3 Claims. (Cl. 43—16)

This invention relates to improvements in fishing equipment and is particularly directed to a novel fishing device for use in ice fishing.

A primary object of this invention is to provide a simple, sturdy and lightweight frame which is vertically positionable on ice and carries a spring reel for a line extendable from the frame into the water through a hole in the ice.

Another main object of this invention is to provide a one-piece frame which is formed from tubular stock bent upon itself to form supporting legs, which legs have their lower free ends axially split to provide divergent feet which grip into the ice and hold the frame upright while preventing it from creeping on the ice.

A further object of importance of this invention is to provide signal means carried by the reel and the frame for signaling a catch, such signal means including an adjustable striker arm or bar on the reel and bells or similar noise producing elements on the horizontal top of the frame, the bar engaging the bells on each return rotation of the reel, which is rotated by a spring upon the release of a latch means by the pull of a fish on the line.

Another important object of this invention is to provide a simple, compact and inexpensive fishing device particularly designed for ice fishing.

The foregoing and ancillary objects are attained by this invention, the preferred form of which is set forth in the following description and illustrated in the accompanying drawing, wherein.

Figure 1:
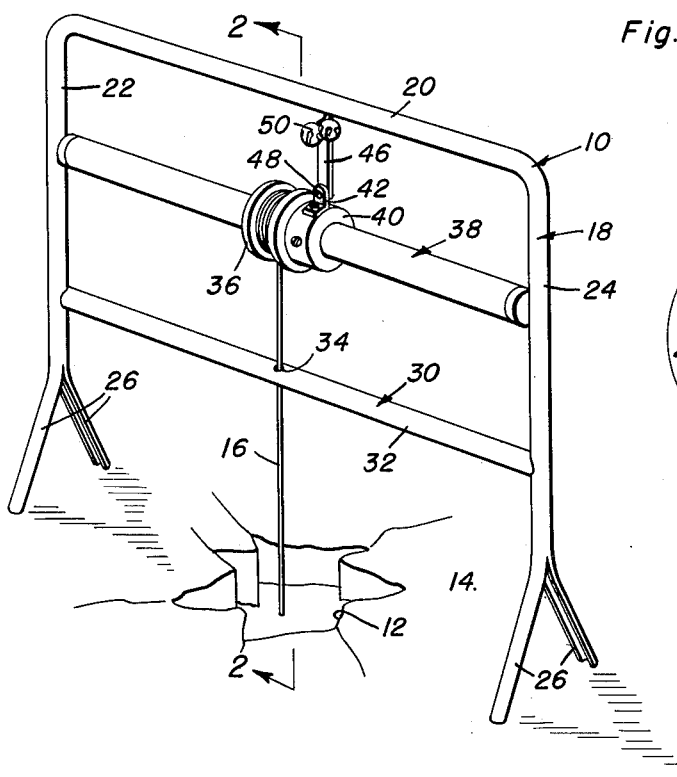
Fig. 1 is a perspective view of the fishing device of this invention, showing the same in use.

Referring now more particularly to the drawing, the fishing device 10 is designed particularly for ice fishing wherein a hole 12 is cut in the ice 14 and through which a line 16 is lowered into the water.

Figure 2:
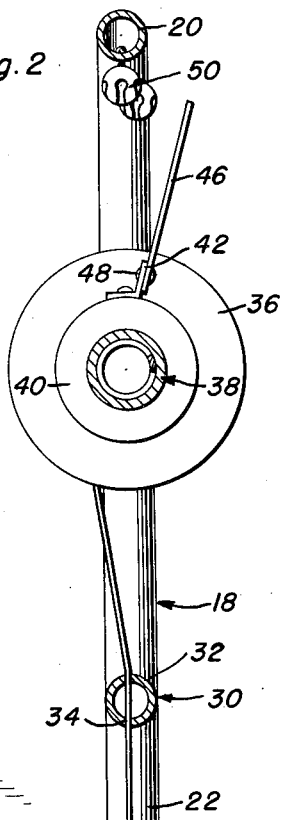
Fig. 2 is a vertical sectional view taken on line 2—2 of Fig. 1.

The fishing device 10 includes a one-piece frame 18 which is formed from lightweight but sturdy tubular stock, preferably aluminum. The tubular member, forming the frame 18, is bent upon itself to provide a straight horizontal top bar 20 from the ends of which parallel and coextensive legs 22 and 24 depend. The legs are each identically formed with divergent supporting feet 26, which are formed by axially splitting the outer or free ends of the legs for a certain distance. After the ends are split, the sections are spread apart into divergent relationship so as to support the frame. It is to be particularly noted (see Fig. 2) that the feet are semi-circular in cross-section and that the edges of the feet face inwardly and that the ends of the edges point downwardly so as to define the gripping means on the feet. Such gripping means is defined by the pointed ends 28 which dig into the ice to prevent the frame from creeping on the ice.

The frame carries a guide means 30 for the line, such means including a tubular rod 32 which is fixedly secured at its ends to the legs, well below the top bar 20. The rod 32 is formed with a vertical aperture 34 for the friction free passage of the line therethrough.

A reel 36 is provided for the line and the reel 36 is fixedly circumposed on a spring roller 38 which is rotatably journalled between the legs, intermediate of and parallel to the rod 32 and the top bar 20. The roller 38 is of conventional construction and may be of the type disclosed in U. S. Patent No. 1,212,696, which includes a coil spring means that provides a return rotative movement and a catch means. Neither of such means is shown, since the roller is conventional in structure and operation, one example of such element being a window shade roller.

Figure 3:
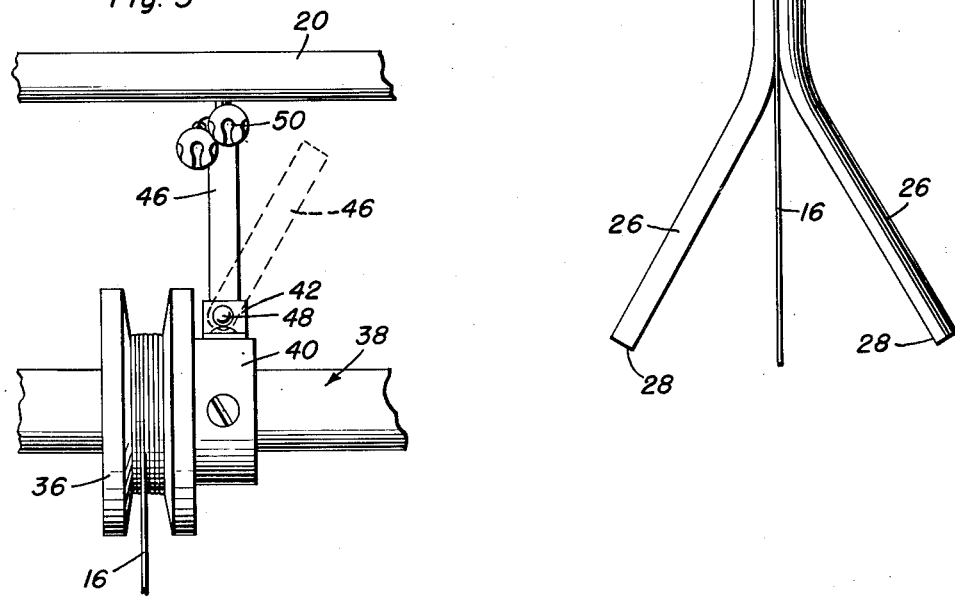
Fig. 3 is a detailed front elevational view of the signal means.

A collar 40 is fixedly circumposed on the roller contiguous to the reel 36 and has a flange 42 of an angle clip 44 radially projecting therefrom. A striker bar or arm 46 is pivoted by a pin 48 to the flange 42, the bar being movable about the pivot from a radial position (shown in full lines in Fig. 3) to an offset position (shown in dotted lines in Fig. 3). Cooperating with the bar 46 are bells 50 which hang from the top frame member or bar 20. The bells are positioned so as to be in the rotative path of the bar, when in its radial position, as the roller is rotated by the spring means to reel in the line 16.

In use, the frame is positioned upright on the ice 14 with the gripping means 28 dug into the ice. The line 16 is lowered through the hole 12 by manually pulling it downwardly. During such playing out of the line, the striker bar is in an offset position so as not to contact the bells. When the line has been lowered to the desired depth, it is released and the roller automatically catches.

When a fish pulls on the line, the tug releases the catch means and the spring rotates the roller to reel in the line. The striker bar, having been beforehand reset in its operative radial position, will strike the bells to signal the landing of a fish.

While the best known form of this invention has been disclosed herein, other forms may be realized as come within the scope of the invention defined by the appended claims.

What is claimed is:

1. A fishing device for ice fishing comprising a frame composed of a horizontal member having supporting legs depending from its ends, ice engaging terminal feet on said legs, a guide means for a fishing line transversely carried between the legs and disposed below the horizontal member, a reel for said line, rewind means having said reel mounted thereon for rotation therewith, said rewind means being supported between the legs intermediate of the guide means and the horizontal member and permitting the line to be manually played out and automatically rotating the reel to wind in the line when a fish is caught on the line and pulls thereon, a striker bar carried by the reel and extending radially therebeyond and rotatable therewith, a signal bell depending from the horizontal member and lying in the rotative path of the striker bar so as to be struck thereby as the reel is automatically rotated to wind in the line, said striker bar being pivotally connected to said reel for rotation in a plane transverse to the axis of rotation of said reel so as to be movable to a position out of striking engagement with said signal bell while paying out said fishing line.

2. A fishing device as claimed in claim 1, wherein said horizontal member and legs are integral and are formed from a light-weight tubular member bent intermediate its ends to provide the horizontal member and the legs which extend downwardly in parallelism from the ends of the horizontal member, said legs having their terminal ends split along a plane passing through the axis of said horizontal member and said legs to define split sections, each of said split sections diverging downwardly at an acute angle with respect to the axis of said legs to define terminal feet, the diametrically opposed edges of which dig into the ice.

3. A fishing device as claimed in claim 1, wherein said guide means includes a tubular rod secured at its ends to the legs and having a transverse aperture paralleling the legs and guiding the line.

References Cited in the file of this patent

UNITED STATES PATENTS

| | | |
|---|---|---|
| 1,524,011 | Ballew | Jan. 27, 1925 |
| 1,819,034 | Luelloff | Aug. 18, 1931 |
| 2,577,552 | White | Dec. 4, 1951 |
| 2,642,692 | Smith | June 23, 1953 |